Figure 4:
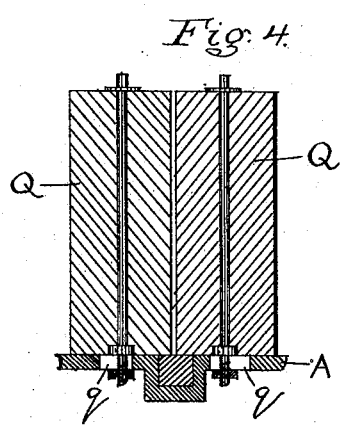

(No Model.) 2 Sheets—Sheet 1.
J. G. GOOGINS.
MITERING MACHINE.
No. 376,192. Patented Jan. 10, 1888.
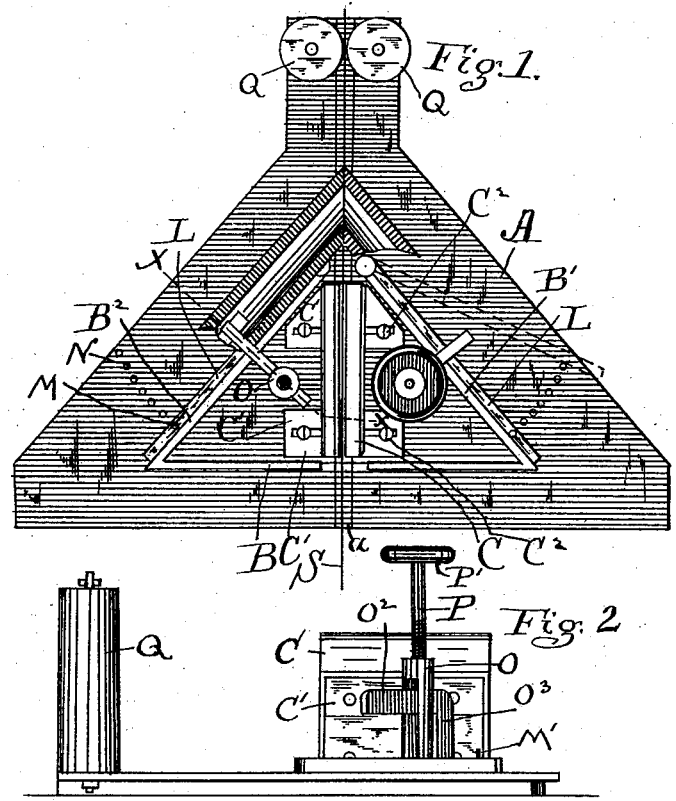
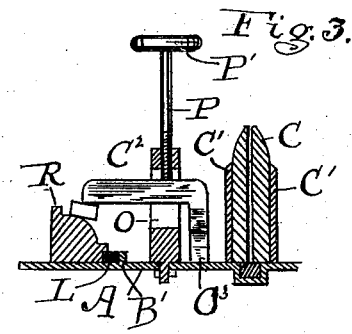
Witnesses:
Elgin C. Verrill
Robert A. Davis
Inventor:
James G. Googins
by S. W. Bates
his atty (No Model.) 2 Sheets—Sheet 2.
J. G. GOOGINS.
MITERING MACHINE.

No. 376,192. Patented Jan. 10, 1888.

Witnesses:
Elgin B. Verrill.
Wilbur F. Lunt.

Inventor:
James G. Googins
by S. W. Bates
his atty.

UNITED STATES PATENT OFFICE.

JAMES G. GOOGINS, OF FAIRFIELD, MAINE, ASSIGNOR OF ONE-HALF TO CHARLES ROWELL, OF SAME PLACE.

MITERING-MACHINE.

SPECIFICATION forming part of Letters Patent No. 376,192, dated January 10, 1888.

Application filed February 21, 1887. Serial No. 228,321. (No model.)

*To all whom it may concern:*

Be it known that I, JAMES G. GOOGINS, a citizen of the United States, residing at Fairfield, in the county of Somerset and State of Maine, have invented certain new and useful Improvements in Mitering-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mitering-machines or devices for holding wood moldings and similar articles in place when the same are to be sawed off to form a miter-joint, it being adapted to picture-frame work and work of a similar character where the pieces of molding are to be nailed together to form a frame.

Hitherto mitering-machines have been made of various kinds, these machines being provided with guides for the saw to run in and guides to fix the proper position of the molding to give the required bevel to the joints, and some machines of this class have contained clamps for holding the molding in place while being sawed. One of the chief difficulties with these machines has been that they allowed no space for nailing the two pieces of molding together without removing them from the machine.

My invention consists of a triangular bed-piece having one set of guides permanently affixed thereto in the form of a right-angled triangle, a pair of vertical guides to guide the saw centrally, a pair of upright rolls to guide the end of the saw, and a pair of clamps acting downward on the top of the molding to hold it in place while being sawed and nailed, each of said clamps consisting of a centrally-slotted upright standard pivoted to the machine, a bent dog passing through said slot, one end of which dog rests on the bed of the machine, the other end extending over the molding, and a screw passing through the top of said standard to operate said clamp.

My invention further consists in the application to the above-described machine of a pair of auxiliary flanges or guides hinged to the inclined permanent guides at a point near the sawing-line, in combination with means for clamping these swinging guides at any desired angle. The arrangement of parts is such that a clear space is left about the part where the joint is formed to admit of the nailing up of the joint without removing the pieces of the molding.

My invention is illustrated in the accompanying drawings, in which—

Figure 1 is a plan or top view. Fig. 2 is a side elevation. Fig. 3 is a part section through line *x x* of Fig. 1. Fig. 4 is an enlarged section through guide-rolls.

A is the bed-piece, preferably of cast-iron. It is generally in the form of a right-angled triangle, and has a groove, $a$, extending from the apex of the right angle to the center of the opposite side, and in this groove is inserted a wooden strip, $a$, to receive the saw-teeth.

B B' B² are three flanges secured to the base A or cast in one piece with it. The two guides or flanges B' B² form with each other a right angle, and with the flange B an angle of forty-five degrees, and their ends have a space between them through which runs the groove $a$. The flange B is at right angles with the saw-line. All of these flanges are low enough so that they will enter the rabbet of an ordinary picture-frame molding, allowing the edge of such molding to project over it.

C C are a pair of upright guides for the central portion of the saw S. They are composed of wood or other suitable material, and are bolted to the base by means of the slotted flanges C', which may be adjusted laterally by loosening the bolts C². A pair of upright rollers, Q Q, are bolted to the bed near the end of the groove $a$, and they form guides between which the end of the saw runs. These rolls Q are bolted to the base A through slots $q$ $q$, (see Fig. 4,) which allow the rolls to be laterally adjusted as they are worn down by the action of the saw.

L L are two auxiliary guides hinged at or near their ends to the fixed flanges B' B² at a point near the saw-line. These auxiliary guides L are provided with pin-holes M M, and similar holes, N N, are cut in the base in such positions that the guides L L may be secured at any required angle by passing a pin, M', through the holes M and N. These guides, where a simple miter is to be cut, are swung in against the flanges B' B², allowing the molding to rest against them, or they may be entirely removed where the machine is to be used for ordinary miters.

O O are two upright standards, each pivoted to the bed A and having a central vertical slot or groove through which passes the dog O', having a horizontal arm, O², and a vertical arm or foot, O³. The foot O³ rests on the bed of the machine and the arm O² extends out over the molding, upon which it is clamped or screwed down by means of the screw P, which passes down through the top of the standard O and impinges against the horizontal arm O². P' is a handle for operating the screw P. The end of the dog O', which comes against the molding may be provided with a cushion, which will not abrade the surface of the molding. In practice I use a small block of soft wood, L L, to interpose between the clamp and the molding.

My device is used as follows, viz: The molding is put in place, resting against the guide L, or, if this is removed, against the flange B' or B². The clamp O' is then screwed down on the molding, after which the end is sawed off. The molding is then unclamped and slipped slightly back, and the molding on the other side is sawed off in a similar manner. The two ends are then placed together and each side clamped down and the corners nailed from the outside without removing either piece of molding.

It will be observed that a clear space is left about the joint, whereby the latter can be nailed while still in the exact position as when it was sawed off. A perfect joint may thus be quickly and easily made, and the joint when made is perfectly square. The larger sizes of frames may be made and nailed up complete without removing them from the machine. When a piece is to be cut off at right angles, it is rested against the flange B.

I claim—

1. In a mitering-machine, a bed-piece having secured thereto two flanges, each making an angle of forty-five degrees with the sawing-line, a pair of upright guides secured to the bed of the machine to guide the body of the saw, and a pair of upright rolls adjustably pivoted to the bed of the machine to guide the ends of the saw, combined with clamps for holding the molding in place, each of said clamps having a centrally-slotted upright standard pivoted to the bed of the machine within said flanges, a bent dog passing through said slot, one end of which dog rests on the bed of the machine, the other end extending over the molding, and a screw passing through the top of said standard to operate said clamp, substantially as described.

2. In a mitering-machine, a bed-piece having secured thereto two flanges, each making an angle of forty-five degrees with the sawing-line, an auxiliary guide hinged to the outside of each of said flanges near the sawing-line, and means for securing said auxiliary guides at any required angle to the flanges, combined with vertical guides for directing the saw, and clamps for holding the molding in place, substantially as shown.

In testimony whereof I affix my signature in presence of two witnesses.

JAMES G. GOOGINS.

Witnesses:
  E. W. McFADDEN,
  F. E. McFADDEN.